J. A. McCASKELL.
CONTINUOUS ROTARY PRESSURE FILTER.
APPLICATION FILED APR. 18, 1917.
1,266,133.
Patented May 14, 1918.
4 SHEETS—SHEET 1.
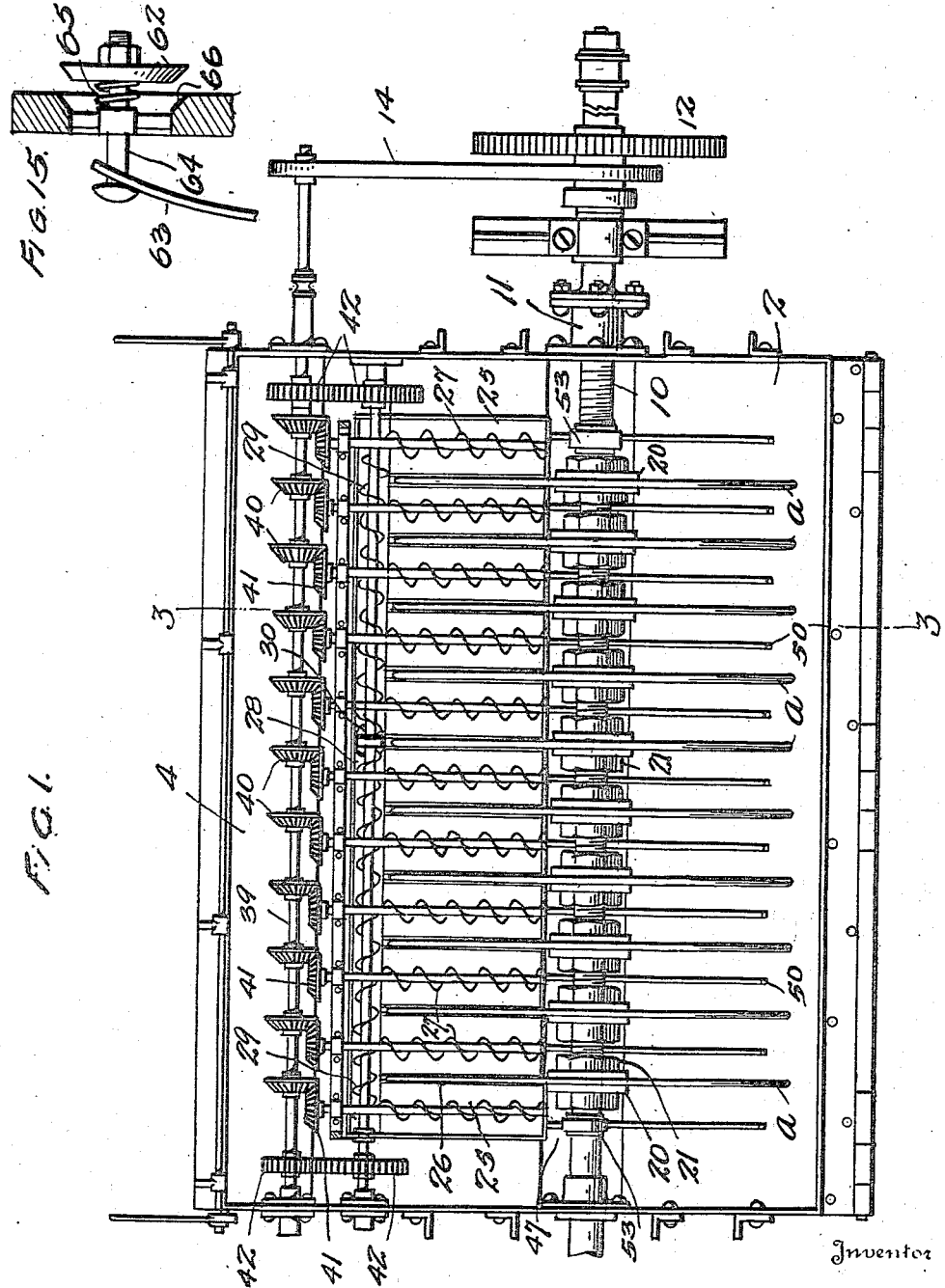
Inventor
Jasper A. McCaskell.
By T. Walter Fowler
Attorney

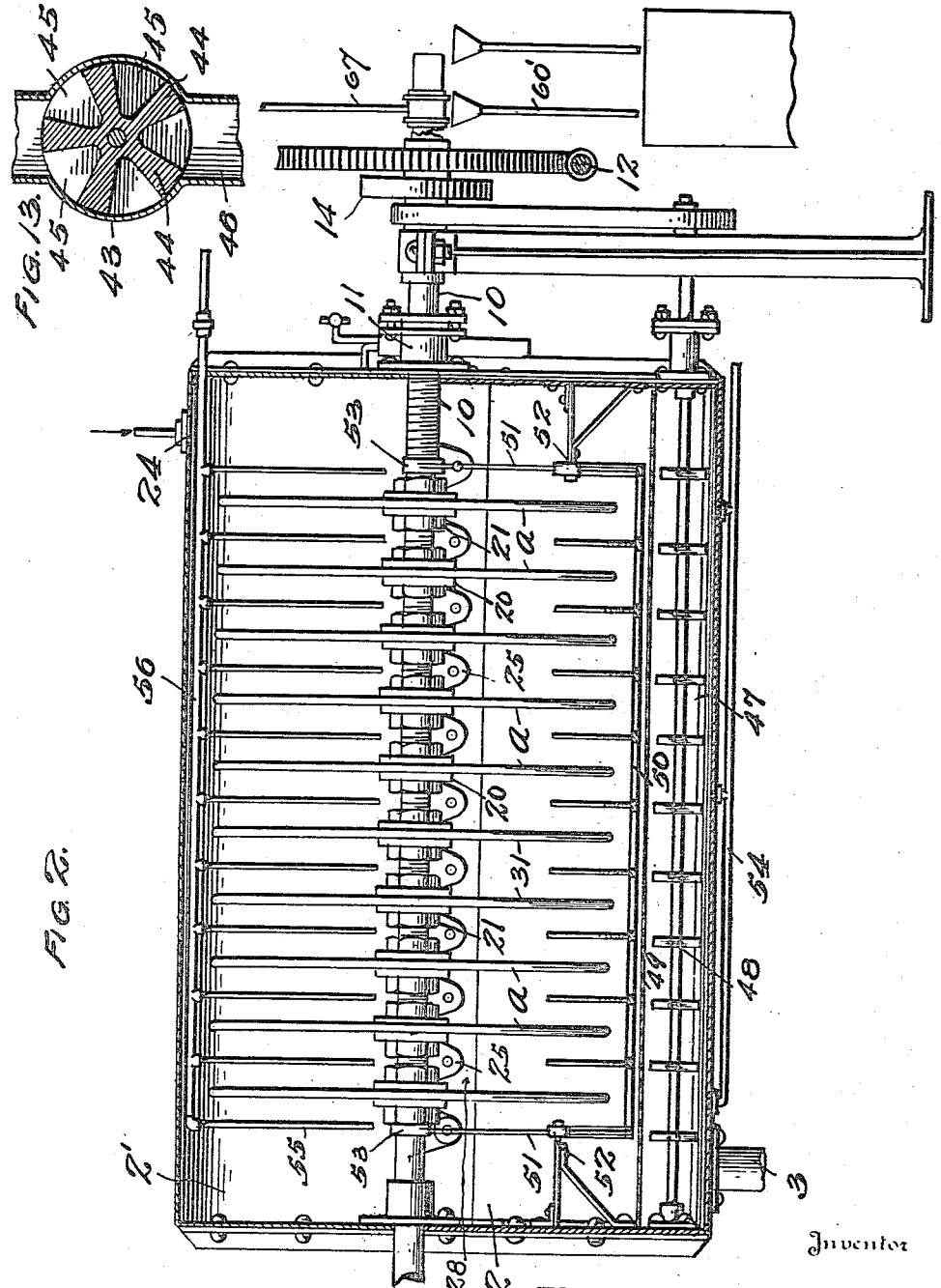

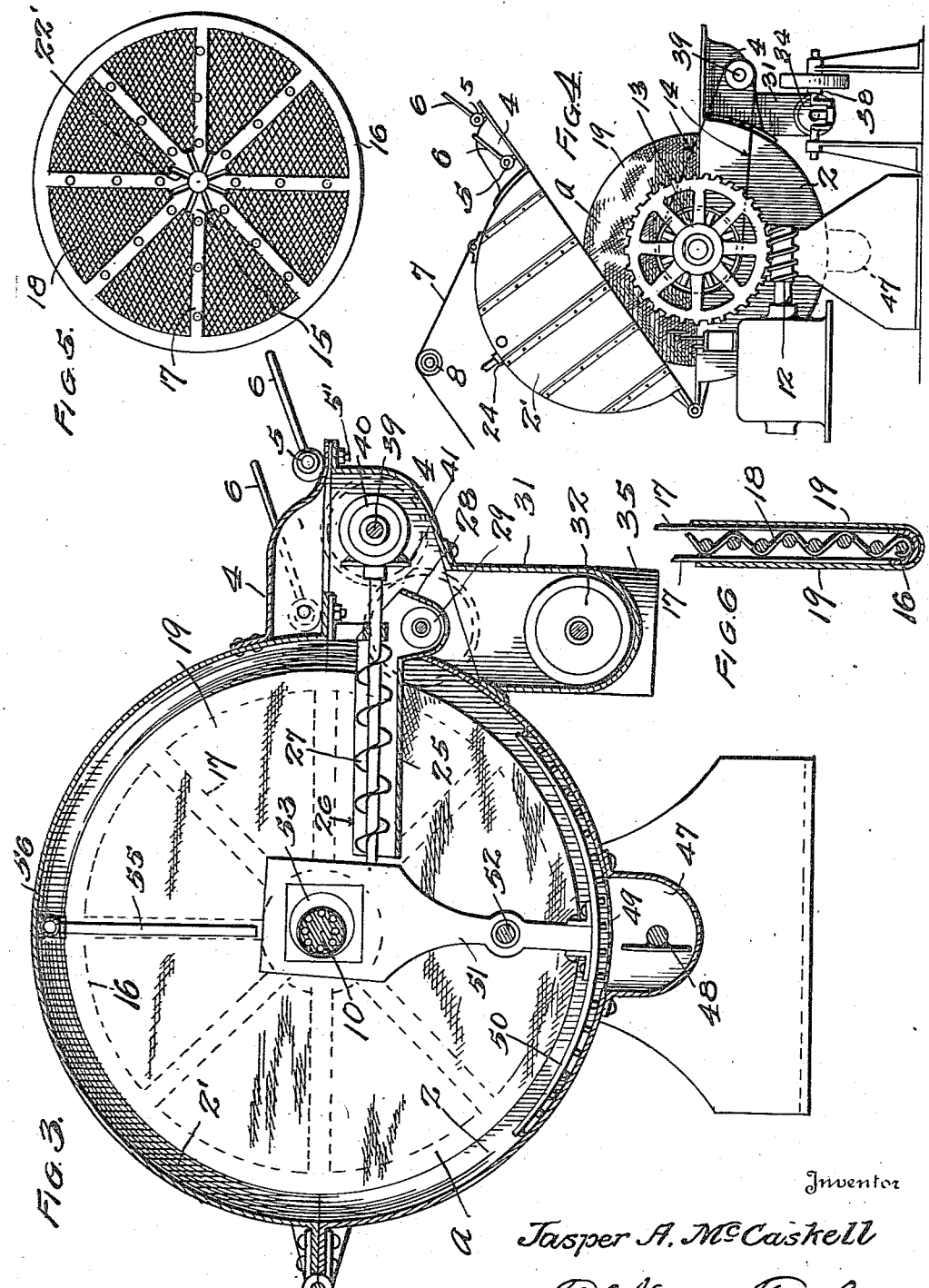

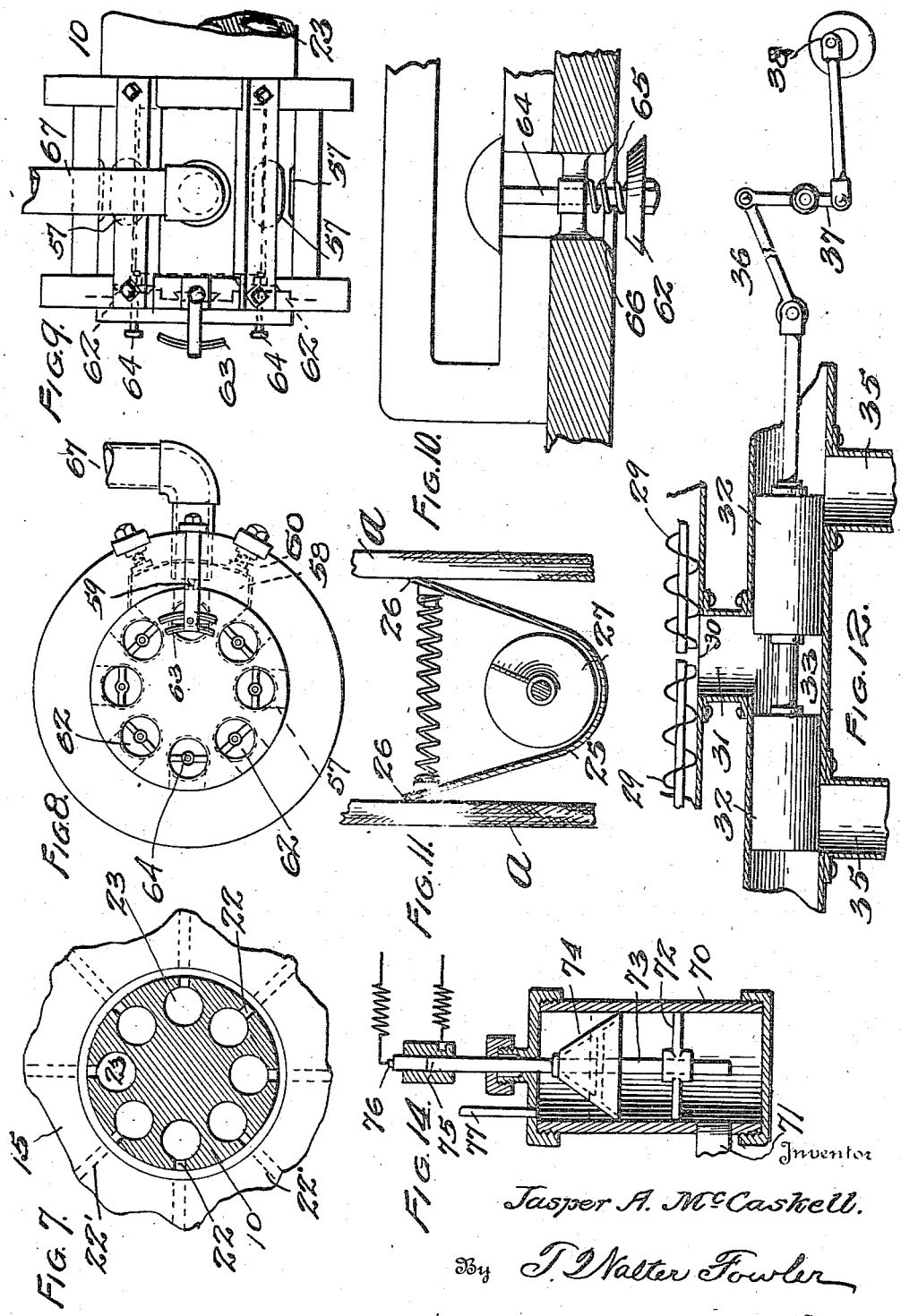

UNITED STATES PATENT OFFICE.

JASPER A. McCASKELL, OF SALT LAKE CITY, UTAH.

CONTINUOUS ROTARY PRESSURE-FILTER.

1,266,133.  Specification of Letters Patent.  Patented May 14, 1918.

Application filed April 18, 1917. Serial No. 162,887.

*To all whom it may concern:*

Be it known that I, JASPER A. McCASKELL, a citizen of the United States, residing at Salt Lake City, in the county of Salt Lake and State of Utah, have invented certain new and useful Improvements in Continuous Rotary Pressure - Filters, of which the following is a specification.

My invention relates to an apparatus which may be employed, for instance, for separating slimes from which precious metals have been dissolved and the liquid which holds the precious metals in solution. In the cyanid process, for example, when gold or silver bearing slimes are mixed or brought into contact with the cyanid solution, the precious metals are dissolved and carried in the liquid in a state of solution. To effect the separation of the metal-laden solution from the solid matter, by means of an improved filtering apparatus, of the rotary pressure type, is an essential object of the present invention.

While my invention is particularly useful for metallurgical work, it is not, however, to be understood that it is limited to such use, since it may be successfully employed in other fields and substantially wherever the separation of solids from liquid is desired. I wish to state, therefore, that the pressure filter apparatus which I am about to describe, is capable of almost universal use in the art of filtration, and hence I design to employ it not only in the filtration of mineral-bearing slimes and the like, but also for filtering saccharine solutions, chemicals, and in whatever field it is purposed to separate a liquid from a solid and to discharge the solid matter which has accumulated on the outside of the filtering medium during the filtering process.

With the above and other objects in view my invention consists of the parts, and the constructions, arrangements and combinations of parts which I will hereinafter describe and claim.

In the accompanying drawings forming part of this specification and in which similar reference characters indicate like parts in the several views;

Figure 1 is a plan view showing the casing broken away, of a filtering apparatus embodying my invention.

Fig. 2 is a side elevation of the same, the casing being in section.

Fig. 3 is a cross-sectional view on the line 3—3 of Fig. 1.

Fig. 4 is an end elevation, showing the divided casing with one of the sections thereof elevated to expose the filter medium.

Fig. 5 is a plan view partially broken away, of one of the filter leaves.

Fig. 6 is a sectional view of a filter leaf.

Fig. 7 is an enlarged cross-section of the central shaft showing filtrate passages and a fragment of a filter leaf connecting therewith.

Fig. 8 is an end elevation of the central shaft showing valves controlling the passages through the shaft.

Fig. 9 is an elevation of a portion of the shaft showing valves at the end of the filtrate passages, and means for operating the valves.

Fig. 10 is a sectional view showing the mounting of one of the valves.

Fig. 11 is a cross-sectional view of a scraper interposed between adjacent filter leaves.

Fig. 12 is a sectional detail showing a means for discharging dislodged solids.

Fig. 13 is a modification showing another form of device for discharging solids.

Fig. 14 is an enlarged sectional detail of a pump regulator.

Fig. 15 is a detail of one of the valves, 62, showing an actuator therefor.

In carrying out my invention, I may employ the active filter agents in connection with an appropriate shell or casing, 2, of any suitable capacity, and which, in the present case, is of the pressure-filter type; namely, it is a closed shell of such construction that it will readily resist the internal pressures to which it is subjected during the filtering functions, said shell having in its lower portion a suitable inlet, 3, by which the material to be filtered is admitted to the interior of the shell, and in which shell this material rises until a substantial part of the lower portions of the hereinafter described filtering agents will be submerged. The depth of the material in the shell may be regulated and maintained in some appropriate manner.

In order that there may be ready access to the interior of the shell, and that the filtering agents may be exposed for any desired purpose, I prefer to construct the casing or shell of two parts, the upper part, or section, 2', being hinged along one of its longitudinal edges, or otherwise, to a corresponding part of the lower section or portion of the casing or shell, and each section of said shell having extending housings or portions, 4, there being also suitable provision for locking the sections of the shell or casing tightly together, which is necessary during the operation of the filter. While any appropriate and well known mechanism may be used for thus locking the two parts of the shell tightly together, I have shown for present purposes this locking mechanism as comprising one or more locking cams, 5, operated by appropriate levers, 6, said cams being mounted on the extended part or housing, 4, of the top section of the shell or casing and carrying bolts, 5', and being adapted to press this portion into intimate contact with the corresponding projecting portion or housing, on the lower section of the shell or casing, as will be readily understood by those skilled in this art.

Any suitable means may be employed in connection with the top section, 2', of the shell or casing for elevating the same when desired. For this purpose, a simple rope or chain, 7, connected to the section and passing over a guide pulley, 8, or the like, to a winding drum or other elevating device, not shown, may be employed. Extending longitudinally and centrally through the shell and which shell in the present instance is shown as of cylindrical formation, is a hollow shaft, 10, which is appropriately mounted for rotation and extends through a stuffing box, 11, fixed to the end head of the shell, said shaft being provided with appropriate means whereby rotation may be imparted to it, and which means may include a worm-drive mechanism, 12, and a band-wheel, 13, from which latter power may be derived through the medium of a belt or connection, 14, to drive suitable scraper elements, which I will hereinafter describe.

The hollow shaft, 10, is externally threaded and on this shaft are spaced suitable filter elements which in the present instance are in the form of disks, a, and which include inner and outer rims, 15 and 16, and connecting spokes or arms, 17, the spaces between the spokes being occupied by corrugated or foraminous plates, 18, which form an internal backing for the outer covering or sides of some suitable filtering fabric, 19, which is fixed thereto in any well known and appropriate manner.

The filtering elements, or "leaves" as they are technically called, are thus arranged side by side on the shaft, in spaced relation, so that they occupy substantially the entire length of the shell, in which they operate; and they are fixedly secured in position by means of clamping washers, 20, and appropriate nuts, 21, engageable with the threads of said washer, said shaft having radial ports, 22, connecting with the interior spaces of the filter leaves and said shaft having longitudinally extending passages, 23, as shown in Fig. 7, for the escape of the liquid filtrate, which has been driven through the sides of the filter leaf and which escapes from the interior of said leaves through said ports and into the passages and which liquid filtrate is delivered to outside the machine, as I will hereinafter describe.

From the foregoing it will be understood that the lower portions of the filter leaves are intended to be submerged in the fluid contents of the shell or casing and to which shell or casing pressure may be applied by means of compressed air or the like admitted through a pipe, 24, with the result that the liquid contents of the tank and which contents are maintained in a state of agitation, by suitable appliances, which I will hereinafter mention, will be forced through the sides of the filter leaves and will be directed to the filtrate passages formed in and through the shaft, 10, while the solids in the material being treated, will be deposited on the outer sides of the filter leaves in the form of a more or less thin cake. In the present instance it is designed to progressively remove this solid matter and for this purpose I have shown suitable troughs, 25, extending transversely of the axis of the filtering leaves and having upwardly flaring compressible sides, 26, whose top edges more or less contact with the sides of the rotatable filter leaves, a, and thus serve as scraping edges to remove the solid deposited on the sides of said filter leaves so as to maintain these sides substantially clean, the removed material dropping into the bottom of the troughs and being removed lengthwise thereof through the medium of a suitable spiral or other conveyer, 27, which is designed to deliver the material to a further trough, 28, within the lower closed housing or extension, 4, on the lower section of the shell or casing and which last-named trough, 28, extends lengthwise of the shell or casing and communicates with the discharge ends of the transverse troughs, 25, whereby the solids discharged from the combined transverse troughs are received into a single longitudinally-extending trough and by the latter these solids may be delivered to a point outside of the shell or casing, as by means of oppositely operating spirals, 29, which tend to move the solids toward an opening, 30, just below the inner adjacent ends of the spiral conveyers, whereby the material advancing right-and-left along the longitudinal trough, will drop through the opening for final delivery from the machine. The delivery of these solids may be into a receptacle or cake-drop box, 31, beneath the open end of which travel a longitudinally reciprocating plunger, 32, which has a reduced portion forming a chamber, 33, into which the solids drop, when the chamber alines with the open-bottom of the box, 31, said plunger operating in a suitable casing, 34, having outlets, 35, which are covered and uncovered during the reciprocation of the plunger and through which outlets the plunger advances the charges of deposited material during its successive reciprocations. The plunger may be operated by any well known mechanism and for present purposes I have shown in Fig. 12, a rod, 36, connected to the plunger and in turn connected to a rocking member, 37, operated from a crank pin on some appropriate form of rotor, 38.

The several transverse and longitudinal conveyers are appropriately connected to the driving mechanism and this may be done by the belt, 14, from the main-drive operating a pulley on a longitudinal shaft, 39, carrying beveled gears, 40, which are in mesh with other beveled gears, 41, on the shafts of the spiral conveyers, 27. From the shaft, 39, power is communicated to the longitudinally extending conveyer, 29, by intermeshing gears, 42, or other suitable means.

While this described construction is well adapted for my purpose, I wish it understood that I do not limit the broader features of my invention thereto and that I may use other and appropriate means for displacing and carrying from the machine the solids which accumulate on the outer surfaces of the filter leaves during the filtering function.

Other means may, also, be employed for the final discharge of the cake material which has been advanced to the receptacle or cake drop box. For instance, I show in Fig. 13, a cake-drop box continued to form substantially a cylindrical housing, 43, in which operates a rotary wheel, 44, having pockets, 45, which successively come beneath the bottom of the cake-drop box and receive charges of the discharging cake material, these several pockets being successively carried into register with the final outlet, 46, so as to deliver the charges thereto. In either of the instances noted, the arrangements will be such as to prevent the material reduction of pressure in the shell or casing by the escape of air through the final cake discharge.

In order that the material admitted to the shell or casing may be kept constantly agitated to effect a better commingling of the fluid and solid portions of the pulp, I prefer to form a depression or chamber, 47, in the bottom of the shell and into which the pulp is first admitted. In this chamber or depression operates a suitable agitator, 48, which may be driven from the main-power devices and which keeps the material thoroughly stirred, and which pulp may enter the main chamber of the shell through a grating, or narrow openings, 49, and over which grating and the bottom of the shell operates a segmental plate, 50, having ribs on its under surface and serving as a further agitator of the pulp, said segmental plate being connected to the end rockers 51, which are pivoted between their ends on bearings, 52, Fig. 2, and the upper ends of the rockers being enlarged and having openings adapting them to embrace suitable eccentrics 53, fixed to the rotatable central main shaft, 10, whereby a rocking movement is imparted to the ribbed plate and the settling of the solids on the bottom of the interior of the shell is reduced to a minimum.

Also, if further agitation of the pulp is desired it may be effected by the admission of air into the bottom of the tank through an air-supply, 54.

In order to wash the cake material on the sides of the filter leaves to extract any retained values, or for other purposes, water sprays may be discharged against the sides of the leaves through spray pipes, 55, leading from a header or main supply pipe, 56, as shown.

As before stated the hollow shaft, 10, extends substantially the full length of the press. It is provided with the longitudinally extending passages, 23, for the discharge of filtrates, these passages communicating with the interior of the various filter leaves. In the present instance, the shaft is shown as having eight passages and the filter leaves are correspondingly divided into eight divisions from each of which leads a passage, 22', which connects with a port, 22, leading to one of the passages through the shaft, each of the divisions of the filter leaf being independent of the others and each of these sections having its own outlet.

Near the outer end of the shaft, 10, the various filtrate passages connect with transverse outlets, 57, which are made radially through the shaft so that during the rotation of the said shaft the filtered liquid or a wash water, may be discharged through the lower of said outlets. These various outlets are always open except in the one position where a valve, 58, of suitable construction is designed to close the outlets. It is in this latter position when high pressure compressed air is to be forced to the inside of the filter leaves, for discharging the cake, as I will hereinafter describe. In all other positions the outlets, 57, are open.

The valve, 58, is of such construction that it substantially conforms with the curvature of the shaft and said valve and shaft are designed to slide relatively and said valve is provided with a slot, 59, through which high-pressure compressed air may be admitted to the passages, 23, and finally to the inside of the filter leaves. In practice, the sliding valve, 59, is so arranged that its wear may be taken up by means of suitable springs, 60, or the like.

Reference has heretofore been made to the employment of wash water for spraying the cake-matter on the filter leaves, and during the operation of the machine the liquid filtrate and wash water will discharge through the separate passages, which have outlets through the end of the shaft and also through the radial openings, 57.

By reason of this construction, as the radial openings reach their lower position, due to the rotation of the central shaft, filtrate will be discharged into a suitable receptacle, 60', and as the shaft continues to rotate and the aforesaid opening rises to the top of the shaft, the wash water will be delivered straight-way through the proper passages in the shaft and will be discharged through the ports, 23, controlled by valves, 62, and which valves are always open except in one position and that is where the valves have been positively closed by some appropriate mechanism during the discharge of the solid or cake-matter. It will be understood that all of the aforesaid eight or other number of openings which are made through the shaft, connect with corresponding radial outlets, 57, and with the interior of the filter leaves, and each of these passages in the shaft extends beyond the radial openings and through the end of the shaft, and is there controlled by one of the spring-actuated valves, 62, and that these valves are successively operated by some appropriate means, and which means in the present case comprises a cam or curved lifter, 63, fixed to some stationary part and so positioned within the range of the stems, 64, of the valves that as the shaft rotates, these stems are engaged by the lifter to move them outwardly against the tension of their springs 65, and thus close the valves against the seats, 66, of the ports, or outlets, thereby closing the latter. As the valve-stems leave the aforesaid cam or lifter, the springs on the stems immediately react to again open the longitudinal passage to the shaft by the valve moving away from its seat or port, 66. The result of this construction is that as the shaft, 10, revolves each radial opening, 57, will allow the filtrate to be discharged when said opening arrives in its lower position, but as the shaft continues to revolve this opening will be carried to a higher level and will not admit of the discharge of the filtrate therefrom, and therefore the filtrate will be continued on its course through the corresponding longitudinal passage and will be discharged at the end of the shaft through its respective valve-controlled port. The ports at the end of the shaft are never closed except as before mentioned, i. e., when blowing high pressure air through a pipe, 67, and the radial ports, 57, and passages, 23, to the inside of the filter leaves.

As before stated, the pulp in the main shell or casing is designed to be maintained at a uniform level by some appropriate means. The means which may be used for this purpose may be in the form of an automatic regulator which will start or stop a pulp-supply pump, by breaking an electric contact which is connected with a motor for operating the pump. Such a construction I have illustrated in detail in Fig. 14, where the regulator comprises a casing, 70, having a pulp inlet, 71, connecting with the interior of the shell at a point about where the liquid level is to be maintained, said casing having an interior spider, 72, forming a guide for the stem, 73, of an appropriate float, 74, said stem extending through a guide or stuffing box at the top of the casing and carrying a contact member, 75, which is designed to coöperate with a second contact, 76, and which contacts are appropriately connected to a pump-motor, not shown, for making and breaking the current as the float rises and falls in response to variations in the level of the pulp in the main casing or shell. By some such way the pulp level in the main casing or shell is kept constant and the operation of the pump is automatically controlled.

In order to equalize the pressure in the top and bottom of the float chamber I may connect this chamber with an air pipe, 77.

The operation of the apparatus may be generally stated as follows:

Material to be filtered is pumped into the shell or casing through the inlet pipe, 3, and the level of the liquid in the shell is maintained by the float regulator mechanism, which automatically controls the operation of the pulp supply pump. In other words, the level of the liquid is usually kept just below the nuts, 21, which clamp the filter leaves to the central shaft. The filter leaves revolve in the shell or casing under pressure, which is maintained by means of compressed air supplied through the pipe, 24, and the pressure thus admitted to the casing causes the liquid filtrate to be forced through the filter leaves and finally through the passages, 23, in the central shaft and through the radial outlets, 57, or the valve controlled end ports, 66 substantially as before described. As the leaves revolve, the solids which have been formed thereon are washed in the upper portion of the shell by water admitted through the spray pipes, 55, and as said leaves further revolve compressed air may be admitted to the shell or casing to partially dry the cake-material and which drying action occurs until the material is brought into contact with the scraping devices. At this point, compressed air at a higher pressure than is contained in the shell or casing is admitted through pipe, 67, and the sliding valve, 58, and which high pressure air passes through the passages in the shaft and into the filter leaves and by being delivered outwardly through the filtering sides of the leaves acts to blow off the adhering cake material and at the same time cleanse these surfaces. The cake-material dropping into the before described troughs, 25—28, is finally delivered into the cake-drop or receptacle, 31, and then by the pocketed plunger or revolving cake extractor, both heretofore described, said material will be automatically discharged from the machine.

A filter of the character described has a continuous operation, rather than an intermittent one, and it has the added advantage of a large filtering capacity per square foot of filter area. In fact, the greater rate of filtration varies as the square of the pressure. In other words, if I double the filter pressure, my rate of filtration increases say four times. Suction filters of the same type are limited in this respect to the amount of vacuum they can produce, while a pressure filter of the present type is limited only by the strength of the shell which incloses the filter agents.

Having thus described my invention what I claim as new and desire to secure by Letters Patent is:—

1. In a filtering apparatus, the combination of a closed shell or casing adapted to form a pressure chamber; means for admitting the material to be treated to said chamber; a shaft extending through said chamber having a series of hollow filtering elements thereon adapted to rotate in the liquid contents of the casing, said filtering elements and shaft having connecting filtrate passages; means including fixed scrapers and troughs therefor extending transversely of said shaft, said troughs being within said closed chamber, and said scrapers adapted to remove solids deposited on the sides of the filtering elements; and a trough also within the casing extending substantially parallel with said shaft and connecting with the outer ends of the transverse troughs and adapted to receive the material removed from the series of filtering elements, said second named trough having a conveyer for discharging the material received thereinto.

2. In a filtering apparatus, the combination of a closed shell or casing adapted to form a pressure chamber; means for admitting the material to be treated to said chamber; a shaft extending through said chamber having a series of hollow filtering elements thereon adapted to rotate in the liquid contents of the casing, said filtering elements and shaft having connecting filtrate passages; means including scrapers and troughs therefor extending transversely of said shaft, said troughs being within the pressure chamber, and said scrapers being adapted to remove solids deposited on the sides of the filtering elements; a trough within the casing extending substantially parallel with said shaft and connecting with the outer ends of the transverse troughs and adapted to receive the material removed from the series of filtering elements; and a conveyer for discharging the material from the trough, said trough having a centrally-disposed opening and said conveyer being formed of sections adapted to advance the material right-and-left to said opening; and a movable receiver connecting with said opening adapted to receive charges of the removed material, said shell or casing having a final outlet through which the material is discharged by the said receiver.

3. In a filtering apparatus, the combination of a closed shell or casing adapted to form a pressure chamber; means for admitting the material to be treated to said chamber; a rotary shaft extending through said chamber having a series of hollow filtering elements thereon adapted to rotate in the liquid contents of the tank, said filtering elements and shaft having connecting filtrate passages; means within said chamber for removing solids deposited on the sides of the filtering elements; a trough extending substantially parallel with said shaft adapted to receive the material removed from the series of filtering elements, said trough having a conveyer for discharging the material received thereinto, said trough having a centrally-disposed opening in its bottom, and said conveyer being formed of oppositely arranged spirals adapted to advance the material right-and-left to said opening; a casing in the shell and a reciprocating plunger operating therein, having a pocket adapted to communicate with said opening and to receive material dropping therethrough; said shell having a final outlet to which the plunger advances its charge of material; and means for operating the plunger.

4. In a filtering apparatus, the combination with a rotatable shaft having filtering elements arranged thereon, said shaft having filtrate passages extending longitudinally through it, and having radial ports connecting transversely with said passages, of a closed shell or casing in which the filtering elements operate with their lower portions submerged in the fluid contents of the shell or casing; a trough extending longitudinally of the shell having a discharge opening substantially midway of its ends; independent, alined conveyers operating in said trough adapted to advance separated solids right-and-left to said opening; means within the tank for removing said solids from the sides of the filtering elements and delivering the same into said trough; and means for delivering said solids to a point exterior of the shell or casing, while preserving the fluid pressure in the shell, said shell having an extended housing at one side inclosing said trough, 5. In a filtering apparatus, the combination with a rotatable shaft having filtering elements arranged thereon, said shaft having filtrate passages extending longitudinally through it and having radial ports connecting transversely with said passages, of a closed shell or casing in which the filtering elements operate with their lower portions submerged in the fluid contents of the shell or casing; a trough extending longitudinally of the shell having a discharge opening substantially midway of its ends; independent, alined conveyers operating in said trough adapted to advance separated solids right-and-left to said opening; means within the tank for removing said solids from the sides of the filtering elements and delivering the same into said trough; and means for delivering said solids to a point exterior of the shell or casing, while preserving the fluid pressure in the shell, said shell having an extended housing at one side inclosing said trough; and said shell being formed of sections each carrying a part of said housing; one of said sections being hinged to the other; and a locking mechanism for securing the sections of the shell or casing in locked position.

6. In a filtering apparatus, the combination of a closed tank forming a pressure chamber; a shaft extending through said chamber having longitudially extending filtrate passages; filtering elements fixed to said shaft and revoluble therewith, said elements having interior passages communicating with the passages in the shaft and adapted to deliver liquid filtrate thereto; means for admitting the solution to be filtered into said chamber, said filtering elements adapted to have their lower portions submerged in the solution; means for admitting a fluid under pressure into the upper portion of the chamber; means for discharging wash-water against the sides of the upper portion of the filtering elements; said rotatable shaft having radial-ports leading from the filtrate passages and adapted to discharge the wash-water laterally from the shaft as the ports reach their lowermost position; means for admitting high-pressure fluid through said ports and passages and into the filter elements during the rotation of the shaft; normally-open valves controlling the outer ends of the filtrate openings through the shaft; and means for successively closing said valves during the rotation of the shaft to prevent the escape of high-pressure fluid from the outer end of the filtrate passages during the admission of such fluid to the interior of the filtering elements.

7. In a filtering apparatus, the combination of a closed shell or casing forming a pressure chamber; a rotatable shaft having filter leaves fixed thereto, and arranged side by side thereon; means for admitting the solution to be filtered into said chamber, said filtering leaves having their lower portions adapted to be submerged in said solution; means for automatically removing solids from the filter leaves; means for delivering charges of said solids through said casing, while preserving the pressure within the casing; and means for maintaining the level of the solution in said casing.

8. In a filtering apparatus, the combination of a closed shell or casing forming a pressure chamber; a rotatable shaft having filter leaves fixed thereto, and arranged side by side thereon; means for admitting the solution to be filtered into said chamber, said filtering leaves having their lower portions adapted to be submerged in said solution; means for automatically removing solids from the filter leaves; means for discharging said solids through said casing, while preserving the pressure within the casing; and means for automatically maintaining the level of the solution in the casing and controlling the supply of solution to said casing.

9. In a filtering apparatus, the combination of a closed shell or casing forming a pressure chamber; a rotatable shaft having filter leaves fixed thereto, and arranged side by side thereon; means for admitting the solution to be filtered into said chamber, said filtering leaves having their lower portions adapted to be submerged in said solution; means for automatically removing solids from the filter leaves; means for discharging said solids through said casing, while preserving the pressure within the casing; and means for automatically maintaining the level of the solution in the casing and controlling the supply of solution to said casing, said means comprising a chamber exterior to the casing and connecting therewith; a float operable in said casing, and controlled by the level of the liquid; a rotor; and electrical connections between the float and the rotor for automatically making and breaking the circuit which controls the rotor.

10. In a filtering apparatus, the combination of a shell or casing having a depressed chamber in its bottom, said chamber connecting with the interior of the casing through restricted openings; and an agitator operable over the bottom of the casing, said agitator comprising a curved plate having projections thereon, upwardly extending rocker arms connected to the plate, and means on said shaft for operating the rocker arms and oscillating the plate over the bottom of said casing.

11. In a filtering apparatus, the combination of a cylindrical casing formed of similar parts hinged one to the other along one of the meeting sides, said casing having extended portions at the opposite side forming housings; a revoluble shaft extending through said casing having a series of filter leaves fixed thereto; scraping and solids-conveying devices inclosed by the casing and housings, one of said conveying devices extending parallel with the shaft and others of the conveyers extending transversely of the shaft and adapted to deliver removed solids to the first-named conveyer; means for operating the conveyers, said means being inclosed by the casing and its housings, and a third conveying means to which the solids are conducted and by which they are finally delivered from the main casing without loss of pressure therein.

12. In a filtering apparatus, the combination of a closed shell or casing forming a pressure chamber; means for admitting the solution to be filtered into said chamber; means for admitting a fluid under pressure into the chamber above the fluid contents thereof; a rotatable shaft extending through said chamber having longitudinally extending filtrate passages, said shaft having an annular series of lateral ports connecting with the passages, said passages connecting with the interior of the filter elements, and said ports being always open except in one position; a valve for closing successive ports when they reach said position; means for admitting high pressure fluid through said ports and passages into the filter elements during the rotation of said shaft; normally-open valves controlling the outer ends of the filtrate passages through the shaft, said valves having projecting stems; and means in the range of action of said stems engaging successive stems to move them outwardly and thereby close the outer ends of the filtrate passages when high pressure fluid is being delivered into the filter frame.

13. In a filtering apparatus, the combination of a closed shell or casing forming a pressure chamber; means for admitting the solution to be filtered into said chamber; means for admitting a fluid under pressure into the chamber above the fluid contents thereof; a rotatable shaft extending through said chamber having longitudinally extending filtrate passages, said shaft having an annular series of lateral ports connecting with the passages, said passages connecting with the interior of the filter elements, and said ports being always open except in one position; a valve for closing successive ports when they reach said position; means for admitting high-pressure fluid through said ports and passages into the filter elements during the rotation of said shaft; normally-open valves controlling the outer ends of the filtrate passages through the shaft, said valves having projecting stems; and means in the range of action of said stems engaging successive stems to move them outwardly and thereby close the outer ends of the filtrate passages when high pressure fluid is being delivered into the filter frame, said valve-stem operating means including a fixed curved surface over which the valve stems travel during the rotation of said shaft.

In testimony whereof I affix my signature.

JASPER A. McCASKELL.